3,304,059
FORCE-APPLYING MEANS HAVING ADJUSTABLE COUPLING MEANS FOR ADJUSTABLY COUPLING THE SAME TO AT LEAST TWO OBJECTS TO BE FORCIBLY RELATIVELY MOVED
John W. Siliznoff, 4636 W. Ave. L, and Howard W. Snapp, P.O. Box 1, both of Lancaster, Calif. 93534
Filed Apr. 6, 1965, Ser. No. 445,967
8 Claims. (Cl. 254—93)

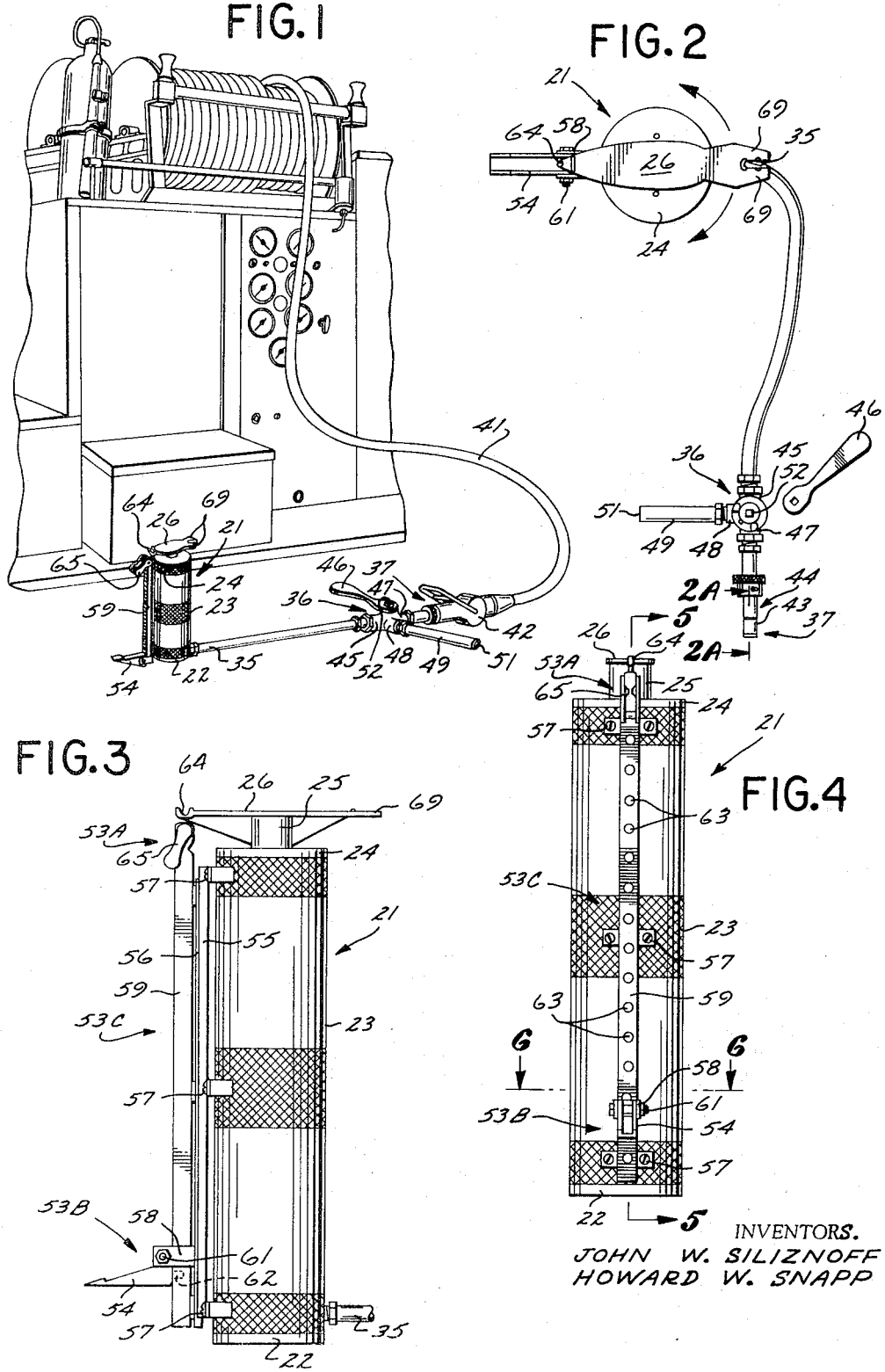

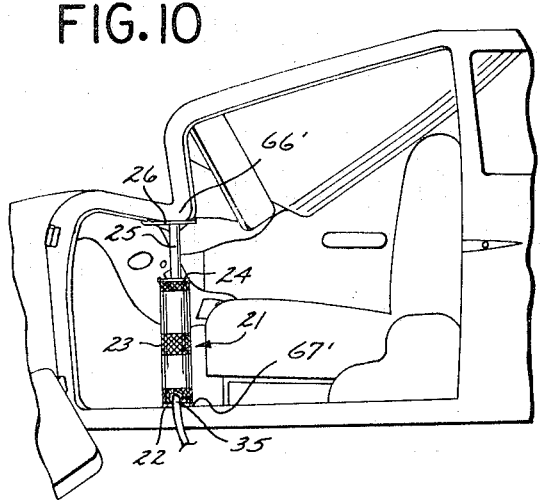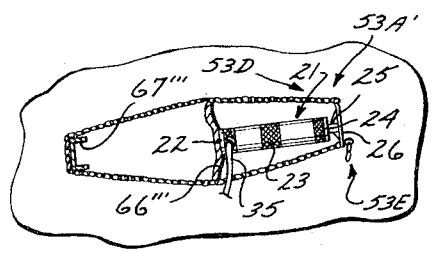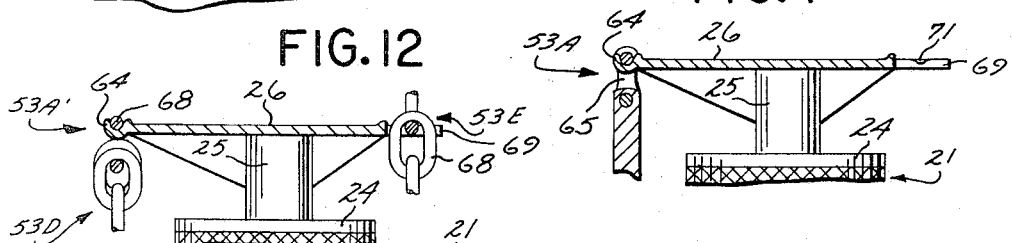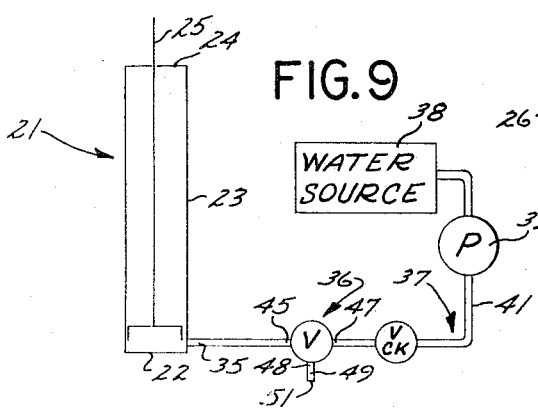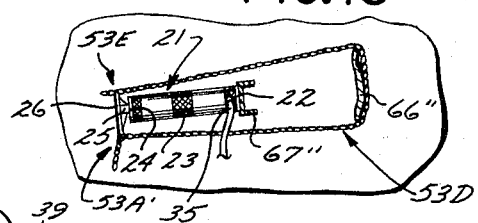

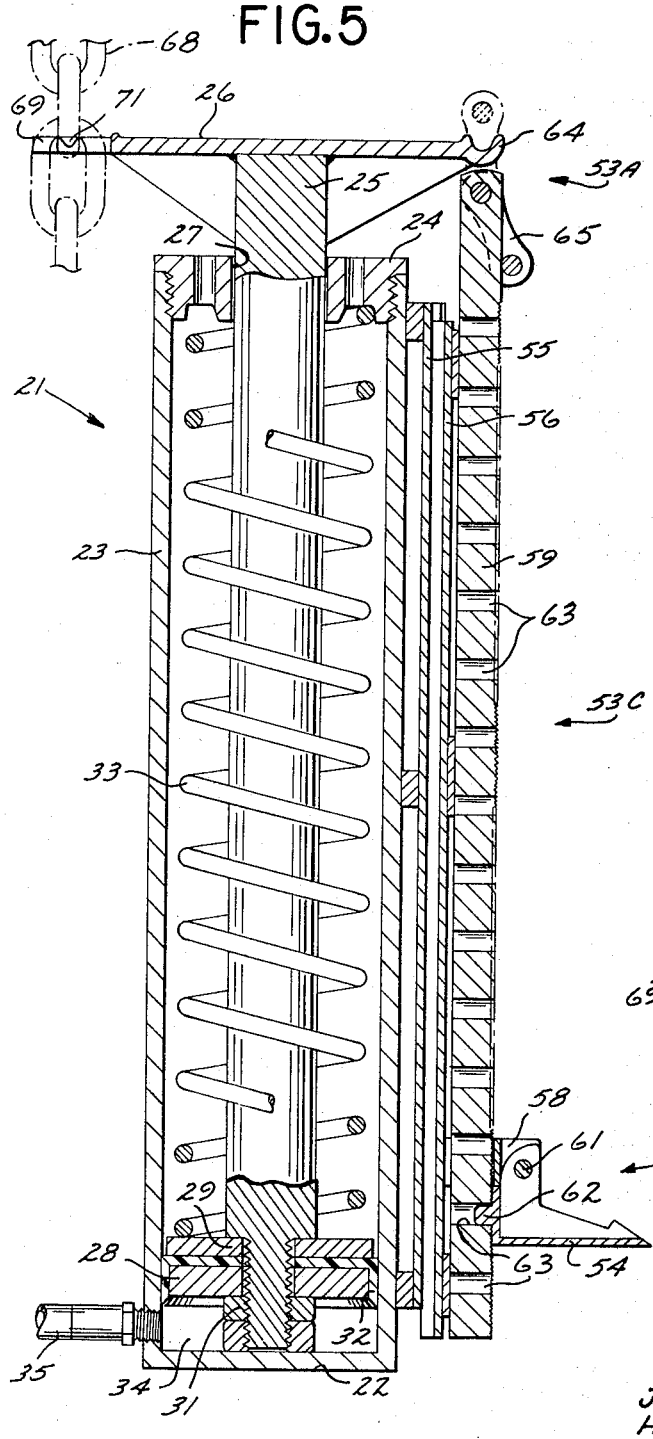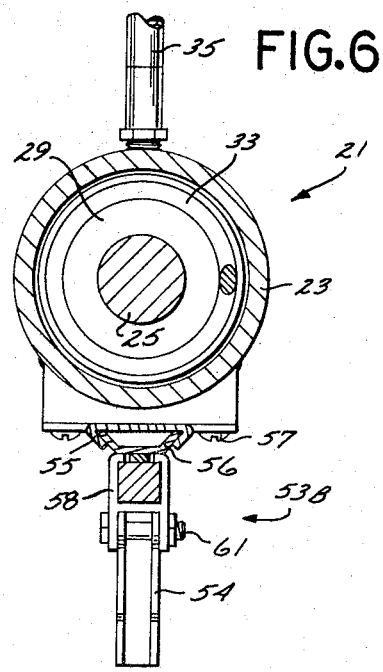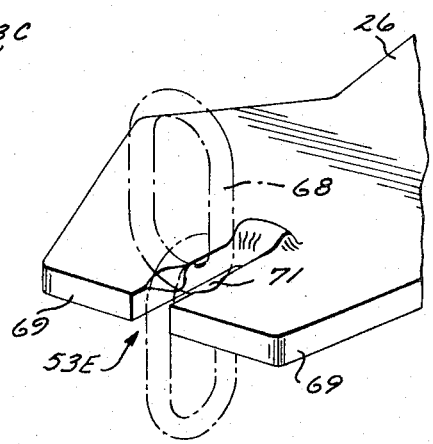

Generally speaking, the present invention relates to a novel force-applying actuator means provided with, or adapted to be provided with, controllably adjustable effective coupling means for making it possible to effectively couple the actuator means in force-applying relatively moving relationship with respect to at least two objects which it is desired to forcibly relatively move. In most applications of the invention, the relative movement of the two objects which it is desired to effect comprises a relative separating movement thereof, although this is not to be construed in a limiting sense since, in certain cases, other types of relative movement may be desired to be effected and can be effected by the apparatus of the present invention. However, in the description which follows hereinafter, said relative movement will be referred to primarily as a separating movement since this is the major application of the present invention. However, it is to be clearly understood that this is exemplary only, and the detailed description of said exemplary mode of operation of the invention which follows hereinafter is to be broadly construed in the light of the statement made above.

In the exemplary form and mode of application referred to above, the present invention may be said, generally speaking, to relate to a novel force-applying actuator means provided with, or adapted to be provided with, controllably adjustable coupling means for making it possible to effectively couple the actuator means in force-applying separating relationship with respect to at least two objects which it is desired to forcibly separate.

In one aspect or mode of operation of the invention, the above-mentioned novel coupling means may be of a compression force-applying type and the actuator means may be said to effectively comprise a force-applying extension actuator means adapted for controllably applying compressive separating force to at least two objects which may have an initial separation lying anywhere within a wide range of permissible separations, and wherein the force-applying actuator means is effectively provided with position-adjustable compressive force-applying coupling means which may be positionally adjusted so as to make the actuator means effectively cooperable with respect to said two objects irrespective of whether they have a small initial separation or a great initial separation therebetween, provided only that they lie within said range of permissible separations.

In another aspect or mode of operation, the above-mentioned coupling means may also comprise a pair of controllably adjustable coupling means, at least one of which comprises a tension force-applying means, while the other usually comprises a compression force-applying means, oppositely directed, of course, for the purpose of engaging and forcibly separating at least two objects as referred to above even though their initial separations may be less than the above-mentioned permissible range of separations allowed for operation of the force-applying actuator means in said first above-mentioned aspect and mode of operation for the direct opposite application of compressive separating force to such objects which are to be forcibly separated.

It should be noted that one particularly advantageous application of the present invention is for emergency use by an emergency vehicle, such as a fire department rescue truck, or other emergency vehicle, which is appropriately provided with power means for controllably operating the actuator means. In one exemplary arrangement, such an emergency vehicle might be a fire truck which is provided with pressurized water from water tank means and pump means carried thereby and which are completely self-operated—that is, require no outside power source other than that carried by the fire truck itself.

Such an arrangement, wherein the fire truck may apply pressurized water to the novel actuator means of the present invention for controllably applying separating force, provides a particularly advantageous emergency arrangement for lifting heavy objects, such as trucks, tractors, or virtually any type of heavy object off of an injured person so that he may be removed for appropriate on-the-spot emergency medical treatment and/or transportation by an ambulance to a hospital for more extensive and intensive medical and/or surgical treatment.

Also, a particularly useful application of the present invention is when a motor vehicle accident of one kind or another has occurred, and the motor vehicle has been crushed in a manner such as to trap one or more persons either in the vehicle, under the vehicle, or in some other manner such that the injured person, or persons, cannot be removed for emergency medical treatment or for reception by an ambulance in order to be taken to a hospital for appropriate medical and/or surgical treatment. It is under such conditions of entrapment of one or more persons at the scene of an accident that much loss of life occurs, since the delay involved in removing an injured person from the wreckage of a vehicle or the like may be just enough to make the difference between life and death and, also, there is the further probability that leaking gasoline or other fuel may catch fire or explode and the entrapped person may be burned to death. In fact, this happens quite often under such accident conditions.

It will readily be understood that the novel adjustable actuator means of the present invention virtually completely solves the above-mentioned prior art problems since a fire truck, or other vehicle provided with either pressurized fluid or other power means for operating the actuator means, may rush to the scene of such an accident involving such entrapment of one or more persons in a crushed vehicle, and the actuator means of the present invention may be quickly adjusted into any of a variety of appropriate positions between various crushed portions of the vehicle, either for the application of direct compressive extension force thereto or for the application of compressive force to one portion of the vehicle and tension force to another portion of the vehicle in a separating direction with respect thereto whereby controllable operation of said actuator means will provide the necessary force for quickly separating said portions of the crushed vehicle.

If necessary, this operation may be quickly repeated with respect to other crushed portions of the vehicle until such time as the vehicle is opened up sufficiently to allow the removal of the entrapped person or persons therefrom. Normally, this will be a matter of a few minutes only because of the novel coupling means of the present invention which, being so widely adjustable, makes it possible for quick engagement with respect to various crushed portions of the vehicle irrespective of their initial separation from each other—that is, up to a permissible maximum separation thereof. In other words, if one finds certain portions of the crushed vehicle which are in need of such forcible separation, only initially two or three or four inches apart, the actuator means of the present invention, by way of the novel adjustable coupling means effectively connected thereto, may be quickly forcibly engaged with respect thereto so that separating force may be virtually immediately applied to said closely adjacent portions of the crushed vehicle. On the other hand, if the initial separation between said crushed portions of the vehicle which are to be forcibly separated are six inches, eight inches, two feet, or a substantially greater distance apart, it is also possible to almost immediately place the novel coupling means connected to the actuator means of the present invention thereagainst for subsequent rapid forcible extension of the actuator means and the corresponding forcible separation of said opposed portions of the crushed vehicle.

In other words, it is the positionally adjustable feature of the novel coupling means of the apparatus of the present invention which makes it possible to quickly apply separating force to opposed portions of a crushed vehicle virtually irrespective of what type of condition it may be in and what extent of crushing it may have experienced. This is an extremely advantageous feature, as compared with prior art force-applying devices, most of which have an initial predetermined separation distance for application to such opposed portions of a crushed vehicle and, in the event that there is any substantial difference (or greater distance) in the actual space between said portions of the vehicle and said normal initial separation position of said prior art force-applying means or devices, then an extensive and time-consuming extending operation is required before the apparatus is even engaged with respect to separated portions of the crushed vehicle for subsequent forcible separation thereof. This long delay in getting such a prior art force-applying device in the proper extended relationship for cooperation with opposed portions of a crushed vehicle is a major disadvantage of such prior art devices.

Furthermore, an even more important disadvantage of such prior art devices is the fact that many of them cannot function at all for applying separating force with respect to portions of a crushed vehicle which have an initial separation less than a predetermined, fairly substantial distance, while this is not at all true of the novel apparatus of the present invention.

Furthermore, as pointed out above, the novel apparatus of the present invention can be initially adjusted for the immediate direct application of force to such portions of a crushed vehicle where the initial separation between said portions of the vehicle varies over an extremely wide range.

In other words, it is obvious that there is no loss of time involved in operating the apparatus of the present invention under virtually any condition of use, and, thus, this leads to extremely rapid emergency and rescue operations of the type exemplified above, although not specifically limited thereto.

It should also be noted that the novel apparatus of the present invention is even arranged to apply tension force with respect to one portion of a crushed motor vehicle while applying compressive force to another portion thereof, with said means for applying tension force comprising a completely positionally adjustable chain or the like, thus providing even greater flexibility in the application of the actuator means of the present invention to crushed portions of a vehicle for the rescue purposes outlined above.

With the above points in mind, it is an object of the present invention to provide a novel force-applying actuator means and novel adjustable coupling means therefor having any or all of the advantages or features referred to herein and including any or all of the structural, functional, or operational features referred to herein, generically and/or specifically, and individually or in combination, and which is of relatively simple, inexpensive, easy-to-use construction adapted for mass manufacture at relatively low cost whereby to be conducive to widespread use thereof, and which, furthermore, is readily adaptable to be operated by various conventional available power sources, and, in certain preferred forms, various available conventional pressurized fluid type of power sources and, in one exemplary form, by the pressurized water type of power source available on a conventional fire truck, thus further leading to the widespread use and application of the invention, primarily for emergency load lifting, moving, separating, and/or emergency or rescue purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention, and several different aspects or modes of operation thereof, are illustrated in the hereinbelow-described figures of the accompanying three sheets of drawings and are described hereinafter.

FIG. 1 is a fragmentary, reduced-size, three-dimensional view of a portion of a conventional fire truck showing a part thereof adapted to provide a supply of pressurized water which may be employed for controllably operating the novel actuator means of the present invention, which is shown in FIG. 1 in an exterior reduced-size, three-dimensional and unactuated form.

FIG. 2 is a fragmentary, somewhat larger scale, top plan view of the form of the apparatus illustrated in FIG. 1, although the high pressure hose from the fire engine and a portion of the quick coupling means at the end thereof, as shown in FIG. 1, are removed from FIG. 2 for reasons of drawing simplification and clarity.

FIG. 2A is an enlarged, fragmentary view, taken substantially on the plane indicated by the arrows 2A—2A of FIG. 2, clearly illustrating the unidirectional check valve means of this form of the invention adapted to be positioned between the source of pressurized water and the control valve and actuator means.

FIG. 3 is a somewhat larger scale elevational view of the actuator means and compressive type adjustable coupling means shown in FIG. 1 in an effectively uncoupled relationship.

FIG. 4 is a left side elevational view of the actuator means and uncoupled coupling means of FIG. 3.

FIG. 5 is a further enlarged view taken substantially along the plane indicated by the arrows 5—5 of FIG. 4, with certain interior portions of the actuator means being shown in full elevation and with other portions being shown in section on the central vertical plane indicated by the arrows 5—5 of FIG. 4. This view also shows, in solid lines, the adjustable coupling means in uncoupled relationship with respect to the actuator means—and, in phantom lines, shows same in coupled relationship.

FIG. 6 is a cross-sectional view, taken substantially on the plane 6—6 of FIG. 4.

FIG. 7 is a fragmentary view somewhat similar to the top portion of FIG. 5, although it is positionally reversed from the showing of FIG. 5 and, in this view, the top portion of the coupling means is shown in a central sectional plane as being fully engaged and coupled with respect to the head portion of the actuator means.

FIG. 8 is a reduced-size, fragmentary view, illustrating one exemplary aspect and mode of operation of the novel actuator means and coupling means of the present invention for applying force in a separating manner with respect to opposite relatively crushed or collapsed portions of a motor vehicle. In this case, the separating force is applied by a base portion of the actuator means and the adjustable coupling means which has been adjusted into a position substantially half the normal height of the actuator means, although it may be adjusted anywhere from the complete height of the actuator means to a position virtually at the base of the actuator means according to the requirements of the rescue operation.

FIG. 9 is a diagrammatic schematic view of the hydraulic system of the exemplary first form of the invention illustrated in FIGS. 1–8.

FIG. 10 is a reduced-size fragmentary view illustrating another mode of operation of the novel actuator means of the present invention for applying force in a separating manner with respect to opposed relatively crushed or collapsed portions of a motor vehicle. In this instance, the separating force is applied by a base portion of the actuator means and the opposed head portion thereof.

FIG. 11 is an enlarged fragmentary, broken away, three-dimensional view fragmentarily, and partially in phantom, showing the additional type of coupling means comprising a tension-applying chain engaged with respect to one end of the movable extendable head or head portion of the actuator means.

FIG. 12 is a fragmentary view, generally similar to FIG. 7, but illustrates the apparatus of the invention employing the tension-applying chain type of coupling means, as illustrated fragmentarily in phantom in FIGS. 5 and 11, and as shown in one typical application in FIG. 13.

FIG. 13 is a greatly reduced-size, fragmentary, somewhat diagrammatic view illustrating the tension-applying chain type of coupling means, such as fragmentarily illustrated in phantom in FIGS. 5 and 11 and in solid lines in FIG. 12, and used with the novel apparatus of the present invention to provide a different type of force with respect to crushed or collapsed portions of a motor vehicle.

FIG. 14 is a view very similar to FIG. 13 and shows the same tension-applying mode of operation of the invention as that illustrated in FIG. 13, although the relationship of the bottom of the actuator means and the intermediate loop portion of the chain means with respect to the portions of the automobile which are to be forcibly moved by operation of the actuator means, is, in effect, reversed from the arrangement illustrated in FIG. 13.

Generally speaking, the exemplary first form of the invention illustrated in FIGS. 1–9 may be said to comprise a force-applying extension actuator means, such as is generally indicated at 21, for controllably applying moving force (usually separating force) to at least two objects which are desired to be forcibly moved (or separated).

In the exemplary form illustrated, the actuator means 21 is a rectilinear motion extension actuator means having a base portion 22, an enclosed cylinder side wall portion 23, a bleed hole vented screw threaded cap portion 24 at the upper end thereof, a connecting rod 25 carrying a head portion 26 at the upper or top end thereof and slidably extending through an aperture 27 in the upper end cap 24 thereof and downwardly into the interior of the cylindrical side wall 23 and being provided at the bottom thereof with a piston 28 fastened by suitable threaded fastening means 29 and 31 thereto, and also being provided with suitable sealing means 32. The upper side of the piston 28 is effectively provided with a compression return biasing spring means 33 which extends upwardly into forcible abutment with the underneath surface of the upper cap member 24, thus normally forcing the piston 28 downwardly into its extreme lowermost position, in the absence of any high pressure fluid or liquid in the variable volume chamber 34, which may be introduced thereinto by way of high pressure inflow duct means 35.

It will be noted that the high pressure inflow duct means 35 is connected to a controllably variably adjustably openable and closable valve means, generally designated at 36, in a manner such as to be effectively in circuit therewith between said actuator means 21 and a source of pressurized fluid, which is generally designated by the reference numeral 37 in FIGS. 1, 2 and 9, for controlling the extension and retraction of the connecting rod member 25 and the head member 26 in accordance with manual operation of the control valve means 36.

It will be noted that, actually, the above-mentioned source of pressurized fluid, generally designated at 37 in FIGS. 1, 2 and 9, may comprise a combination of elements, such as a water tank or source, as indicated at 38 in FIG. 9, a water-pressurizing pump, as indicated at 39 in FIG. 9, a high pressure supply line or hose, such as indicated at 41 in FIGS. 1 and 9, and the quick coupling or connector means indicated at 42 in FIG. 1 (this quick coupling means 42 not being shown in FIG. 9 since it does not comprise any part of the real inventive concept of the present invention).

The quick coupling means 42 is adapted to be engaged and coupled in fluid-tight relationship with respect to the hollow tubular member 43 (best shown in FIGS. 1 and 2A), which is provided therein with unidirectional check valve means, generally designated at 44, as best shown in FIG. 2A, effectively positioned between the above-mentioned source of pressurized water, generally designated at 37, and the control valve means, generally designated at 36; said check valve means 44 being openable in response to downstream (or right to left as viewed in FIG. 2A) pressure drop of a predetermined magnitude thereacross and being closable in the absence thereof in a manner such as is clearly shown in FIG. 2A. The purpose of this will be described hereinafter.

It should be noted that the above-mentioned inflow duct 35 between the control valve 36 and the actuator means 21 effectively comprises a high pressure duct means terminating in what might be termed an actuator port means 45 adapted to be connected to said high pressure duct means 35 by operation of the valve handle 46 into the appropriate position. Said control valve means 36 also has what might be termed a high pressure source port means, indicated at 47, connected between the upstream side of the control valve means 36 and the portion of the rigid tubing 43 at the downstream end thereof, and controllably openable and closable in accordance with appropriate operation of the handle member 46 of the control valve means 36. Said control valve means 36 is also effectively provided with what might be termed dump port means, indicated at 48, comprising a dump portion of the control valve means 36 and effectively connected to a dump tubing or pipe 49 which has an open exhaust end 51; said dump port means 48 being controllably openable and closable in accordance with corresponding appropriate positioning of the handle member 46 of the control valve means 36.

It should be noted that the control valve means 36 may be of any type of conventional so-called three-way valve which usually comprises a rotary ported valve cylinder rotatively operated by the handle member 46 and adapted to place the high pressure source port 47 in controllably adjustable communication with the actuator port 45 for controllably pressurizing the actuator means 21 and causing controllable upward extension of the connecting rod 25 and head 26, as desired. Also, said three-way control valve means 36 is adapted, in response to appropriate operation of the handle member 46, to connect said actuator port 45 with said dump port 48 in a controllably adjustable manner whereby to allow pressurized fluid previously introduced into the variable volume chamber 34 of the actuator means 21, and which has previously caused upward extension of the head portion 26 of the actuator means 21, to be released and vented through the opening 51 at the end of the vent tube 49. This will, of course, allow the head portion 26 of the actuator means 21 to be downwardly retracted under the action of the return biasing spring means 33. Normally, the control valve means 36 will also have an "off" position such that none of the three ports 45, 47, and 48 thereof are interconnected, which will have the effect of locking the actuator means 21 in whatever position it may be in at that time.

It should be noted that the previously mentioned unidirectional check valve means 44 provides an arrangement which will in no way interfere with the extension and retraction of the actuator means 21 as described hereinabove but which will positively prevent complete loss of pressure, and the consequent collapsing of the actuator means 21, in the event that a leak or break in the supply high pressure line or duct 41 should occur. This provides a very desirable safety factor.

Incidentally, it should be noted that the handle member 46 for the control valve means 36 actually comprises a linkage member of the wrench type and may be removed from the square ended shaft 52 with which it cooperates when the control valve means 36 is to be operated.

An important feature of the present invention is the provision of adjustable coupling means for effectively adjustably coupling the relatively extendable base and head portions 22 and 26 of the actuator means 21 with respect to at least two objects, such as crushed portions of a motor vehicle or the like, which are to be forcibly moved or separated. Said coupling means actually comprises the previously mentioned base and head portions 22 and 26 of the actuator means 21 when they are *directly* used for such force-applying purposes, such as, for example, in the manner clearly illustrated in FIG. 10.

On the other hand, said adjustable coupling means also comprises the apparatus generally designated at 53A, 53B, and 53C, which allows longitudinal positional adjustment of the effective compressive force-applying portions of the complete apparatus which, in this instance, comprise the base portion 22 of the actuator means 21 and the pivotally mounted laterally directed extension foot member 54 of the coupling means portion generally designated at 53B, which can be vertically adjusted so as to provide any desired longitudinal spacing between said foot member 54 and said base portion 22 of the actuator means 21 required by the initial separation of the objects or portions 66 and 67 of a motor vehicle to be separated, such as is clearly illustrated in FIG. 8, for example.

It will be noted that the above-mentioned coupling means portion 53C comprises first and second longitudinal member 55 and 56 which are generally of mating angular channel form and which are longitudinally slidably effectively telescopically engaged with respect to each other, with said first member 55 being rigidly fastened by fastening means 57 with respect to the side of the actuator means 21 and parallel to the connecting rod member 25 thereof, and with said second longitudinal member 56 of said coupling means 53C being longitudinally adjustably provided with a controllably operable connection member effectively comprising the previously mentioned foot member 54—said foot member 54 comprising a force-applying object-abutting coupling means portion 53B taking the form of a slidable ring member 58 (of rectangular shape as seen in top plan view in FIG. 6) longitudinally slidably carried by a rectangular rod member 59, which is rigidly fastened to said previously mentioned slidable second longitudinal member 56, whereby to allow said ring member 58, and said foot member 54 pivotally carried by the outwardly directed ears of the ring member 58, to be vertically slidably moved therealong to any desired height with respect to the base portion 22 of the actuator means 21 and to there be pivoted around the pivot shaft 61 so that a rearward or inwardly directed locking projection 62 carried at the rear of the pivotally mounted foot member 54 may be moved into locking relationship within any of the plurality of vertically longitudinally spaced receiving aperatures 63 carried along said rectangular rigid vertical rod member 59, thus providing a means for positively locking the force-applying object-abutting member or portion foot 54 at any of a plurality of heights along the rod member 59, which is adapted to be engaged and coupled with respect to a hook portion 64 carried at one end of the head member 26 by a pivotally mounted link or linkage member 65 which can be moved into a disengaged relationship such as is shown in FIGS. 3, 4, and 5 in solid lines or into an engaged locked coupled relationship, such as is shown in phantom in FIG. 5 and as shown in solid lines in FIG. 7. When so engaged, it will be understood that upward forcible extension of the head portion 26 of the actuator means 21 will correspondingly cause both the rod member 59 and the rigidly attached slidable second longitudinal member 56 of the coupling means portion 53C to be vertically upwardly telescopically extended. This upward extension of the rod member 59 will cause the same upward movement of the corresponding foot member 54, which has been previously locked in any desired longitudinal vertical position therealong, thus applying separating force to opposed portions of a motor vehicle which are to be forcibly separated in a manner such as is clearly illustrated in FIG. 8—and doing so in a manner which allows a complete range of initial relative positional adjustment of the foot member 54 with respect to the base portion 22 of the actuator means 21.

In the exemplary arrangement illustrated in FIG. 8, the above-mentioned opposed portions of the automobile or motor vehicle which are to be forcibly separated may be said to effectively comprise objects to which separating force is to be applied by the actuator means 21, and they are designated by the reference numerals 66 and 67, respectively. It will be noted that it is actually the object 66, comprising a collapsed portion of the automobile, which is to be effectively moved away from the object 67, which actualy comprises a floor portion of the automobile (the floor portion usually overlying a chassis or frame portion). However, either or both of the objects 66 and 67 could have been initially collapsed from their normal position or relationships toward each other, and it should be clearly understood that the apparatus may be used for relatively moving one or the other, or both, of said objects or automobile portions 66 and 67 away from each other (or, in certain cases, toward each other, as will be explained later).

FIG. 10 illustrates exactly the same actuator means 21 as shown in FIGS. 1–9, and the only difference between the showing of FIG. 10 and the previously described showing of FIG. 8 is the fact that the actuator means 21 is used in a slightly different manner. In other words, in FIG. 10 the head portion 26 of the actuator means 21 is the one which directly abuts a collapsed automobile portion 66' for movement thereof away from the floor portion 67' of the automobile. Therefore, in this mode of operation of the actuator means 21, the base portion 22 and the head portion 26 of the actuator means 21 may be said to effectively comprise the previously mentioned coupling means for coupling the actuator means 21 in force-applying relationship with respect to the two objects, or automobile portions 66' and 67', as illustrated in FIG. 10. Otherwise, this mode of application of the invention is identical to that previously described, and no further illustration or description thereof is thought necessary.

FIGS. 11–13 illustrate the same basic actuator means 21 as that illustrated in FIGS. 1–9 and previously described in detail, and also the same as that illustrated in FIG. 10 showing a modified application thereof. However, in FIGS. 11–13, another slightly different and modified application of said actuator means 21 is illustrated and, in this arrangement, it will be noted that the coupling means of the actuator means 21 includes additional elements 53D and 53E, and, also, it should be noted that the previously mentioned coupling means portion 53A is, in effect, somewhat modified in this version and, therefore, will be designated generally by the reference numeral 53A'.

It will be noted that the additional coupling means element 53D comprises a length of tension-applying chain which is adapted to have spaced portions thereof controllably adjustably engaged or coupled with respect to the head portion 26 of the actuator means 21 by way of the coupling means portions generally designated at 53A' and 53E, respectively, as perhaps best shown in FIG. 12.

It will be noted that the coupling means portion 53A' referred to above actually comprises the previously mentioned hook member 64, over which any desired one of the multiple links 68 of the chain 53E can be hooked for varying the effective length of the intermediate looped portion of the chain 53D positioned between said coupling means portion 53A' and the other coupling means portion 53E, which merely comprise a pair of bifurcated finger portions 69 effectively defining therebetween a chain link abutting and engaging slot portion 71 in which a lower one of two adjacent chain link elements 68 can be positioned, with the immediately uppermost one lying thereacross and effectively abutting the tops of each of said fingers 69 whereby to positively lock the chain 53D in a desired controllably adjusted relationship with respect to said coupling means portion 53E.

The intermediate looped portion of the chain 53D may be hooked around any desired object, such as that shown at 66" in FIG. 13, while the base portion 22 of the actuator means 21 may firmly abut another portion 67" of the motor vehicle so that tension may be applied through the intermediate looped portion 53D of the chain to said object or automobile portion 66" for effectively moving same relative to the other object or portion 67" of the automobile. In other words, it will readily be understood that the chain 53D provides even greater usefulness, adaptability, and effective adjustability of the coupling means and the actuator means for force-applying use with respect to at least two objects which are to be forcibly relatively moved, for the general purposes of the present invention, as previously outlined in detail.

FIG. 14 illustrates the same apparatus as shown in FIG. 13 but differently applied with respect to the two portions 66''' and 67''' of the motor vehicle so that operation of the actuator means 21 in an extension manner will cause said two automobile portions 66''' and 67''' to be forcibly moved toward each other in a manner very similar to the arrangement illustrated in FIG. 13, but this will be done by converting the extension of the extension actuator means 21 to tension in the intermediate looped portion of the chain 53D which is coupled with respect to the automobile portion 67''', while the bottom 22 of the actuator 21 is coupled with respect to the other automobile portion 66'''—this being the reverse coupling arrangement from that illustrated in FIG. 13. Otherwise, this modified mode of application of the apparatus is substantially equivalent to that illustrated in FIG. 13, and no further description thereof is thought necessary. Also, it should be noted that the reference numerals employed in FIG. 14 are the same as those employed in FIG. 13 with the exception of the two effectively positionally reversed automobile parts which are designated at 66''' and 67''' in FIG. 14 and which correspond to those designated at 66" and 67" in FIG. 13.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. An adjustably couplable force-applying means for effectively adjustably applying force to at least two objects which are to be forcibly relatively moved, comprising a translatory motion extension actuator means having a base portion and a controllably extendable connecting rod portion, said actuator means being provided with longitudinal position-adjustable coupling means having a force-applying portion effectively coupled with respect to said connecting rod portion and being initially longitudinally positionally adjustable with respect to the base portion of said actuator means, said actuator means being provided with connection means for connecting same with respect to a source of energy and having manually adjustably operable control means in circuit therewith in a position adapted to be between said actuator means and said source of energy for controlling the extension and retraction of said connecting rod portion and said force-applying portion in accordance with manual operation of said control means, said coupling means comprising a head member carried by said connecting rod portion and providing said effective coupling of said connecting rod portion to said force-applying portion of said coupling means and further comprises adjustment means positionally adjustably connectable between said force-applying portion and said head member, said coupling means comprising first and second longitudinal members which are longitudinally slidably effectively telescopically engaged with respect to each other, with said first longitudinal member being rigidly fastened with respect to the side of said actuator means and parallel to said connecting rod portion thereof and with said second longitudinal member of said coupling means being provided with a controllably operable connection member positioned for controllable engagement and disengagement with respect to said head member of said actuator means.

2. An adjustably couplable force-applying means for effectively adjustably applying force to at least two objects which are to be forcibly relatively moved, comprising a translatory motion extension actuator means having a base portion and a controllably extendable connecting rod portion, said actuator means being provided with longitudinal position-adjustable coupling means having a force-applying portion effectively coupled with respect to said connecting rod portion and being initially longitudinally positionally adjustable with respect to the base portion of said actuator means, said actuator means being provided with connection means for connecting same with respect to a source of energy and having manually adjustably operable control means in circuit therewith in a position adapted to be between said actuator means and said source of energy for controlling the extension and retraction of said connecting rod portion and said force-applying portion in accordance with manual operation of said control means, said coupling means comprising a head member carried by said connecting rod portion and providing said effective coupling of said connecting rod portion to said force-applying portion of said coupling means and further comprises adjustment means positionally adjustably connectable between said force-applying portion and said head member, said coupling means comprising first and second longitudinal members which are longitudinally slidably effectively telescopically engaged with respect to each other, with said first longitudinal member being rigidly fastened with respect to the side of said actuator means and parallel to said connecting rod portion thereof and with said second longitudinal member of said coupling means being provided with a controllably operable connection member positioned for controllable engagement and disengagement with respect to said head member of said actuator means, said force-applying portion of said coupling means comprising a slidable ring member effectively longitudinally slidably mounted with respect to said second longitudinal and slidable member and provided with a pivotally mounted, laterally directed, extension foot and an inwardly directed locking projection, said second longitudinal and slidable member of said coupling means being effectively provided with a plurality of longitudinally spaced laterally directed receiving apertures each adapted to receive said inwardly directed locking projection for positively locking said force-applying extension foot in a corresponding longitudinally adjusted position.

3. Apparatus as defined in claim 2, wherein said head member is provided with a chain link-engaging hook portion and a chain link-abutting and engaging slot portion and is further provided with a length of tension-applying chain for firm, rigid, and yet controllably adjustable engagement of said hook portion and said slot portion with respect to selected portions of said tension-applying chain whereby to firmly support an intermediate looped portion of said chain, comprising said force-applying portion, for tension force-applying application to an object which is to be forcibly moved relative to said base portion of said actuator means.

4. An adjustably couplable force-applying means for effectively adjustably applying force to at least two objects which are to be forcibly relatively moved, comprising a translatory motion extension actuator means having a base portion and a controllably extendable connecting rod portion, said actuator means being provided with longitudinal position-adjustable coupling means having a force-applying portion effectively coupled with respect to said connecting rod portion and being initially longitudinally positionally adjustable with respect to the base portion of said actuator means, said actuator means being provided with high pressure duct means connected thereto and having manually variably adjustably openable and closable control valve means in circuit therewith and between said actuator means and a source of pressurized fluid for controlling the extension and retraction of said connecting rod portion and said force-applying portion in accordance with manual operation of said control valve means, said coupling means comprising a head member carried by said connecting rod portion and providing said effective coupling of said connecting rod portion to said force-applying portion of said coupling means and further comprises adjustment means positionally adjustably connectable between said force-applying portion and said head member, said coupling means comprising first and second longitudinal members which are longitudinally slidably effectively telescopically engaged with respect to each other, with said first longitudinal member being rigidly fastened with respect to the side of said actuator means and parallel to said connecting rod portion thereof and with said second longitudinal member of said coupling means being provided with a controllably operable connection member positioned for controllable engagement and disengagement with respect to said head member of said actuator means.

5. An adjustably couplable force-applying means for effectively adjustably applying force to at least two objects which are to be forcibly relatively moved, comprising a translatory motion extension actuator means having a base portion and a controllably extendable connecting rod portion, said actuator means being provided with longitudinal position-adjustable coupling means having a force-applying portion effectively coupled with respect to said connecting rod portion and being initially longitudinally positionally adjustable with respect to the base portion of said actuator means, said actuator means being provided with high pressure duct means connected thereto and having manually variably adjustably openable and closable control valve means in circuit therewith and between said actuator means and a source of pressurized fluid for controlling the extension and retraction of said connecting rod portion and said force-applying portion in accordance with manual operation of said control valve means, said coupling means comprising a head member carried by said connecting rod portion and providing said effective coupling of said connecting rod portion to said force-applying portion of said coupling means and further comprises adjustment means positionally adjustably connectable between said force-applying portion and said head member, said coupling means comprising first and second longitudinal members which are longitudinally slidably effectively telescopically engaged with respect to each other, with said first longitudinal member being rigidly fastened with respect to the side of said actuator means and parallel to said connecting rod portion thereof and with said second longitudinal member of said coupling means being provided with a controllably operable connection member positioned for controllable engagement and disengagement with respect to said head member of said actuator means, said force-applying portion of said coupling means comprising a slidable ring member effectively longitudinally slidably mounted with respect to said second longitudinal and slidable member and provided with a pivotally mounted, laterally directed, extension foot and an inwardly directed locking projection, said second longitudinal and slidable member of said coupling means being effectively provided with a plurality of longitudinally spaced laterally directed receiving apertures each adapted to receive said inwardly directed locking projection for positively locking said force-applying extension foot in a corresponding longitudinally adjusted position.

6. Apparatus as defined in claim 5, wherein said head member is provided with a chain link-engaging hook portion and a chain link-abutting and engaging slot portion and is further provided with a length of tension-applying chain for firm, rigid, and yet controllably adjustable engagement of said hook portion and said slot portion with respect to selected portions of said tension-applying chain whereby to firmly support an intermediate looped portion of said chain, comprising said force-applying portion, for tension force-applying application to an object which is to be forcibly moved relative to said base portion of said actuator means.

7. Apparatus as defined in claim 5, wherein said control valve means is of the three-way type having three exterior ports comprising a high pressure source port adapted to be connected to said source of pressurized fluid, an actuator port adapted to be connected to said high pressure duct means leading to said actuator means, and a dump port comprising a dump portion of said valve means, with said valve means being controllably operable to conect said high pressure source port and said actuator port to any desired degree and also alternatively, when desired, to connect said actuator port and said dump port to any desired degree, said dump portion of said control valve means being exteriorly vented.

8. Apparatus as defined in claim 5, including unidirectional check valve means effectively positioned upstream from said control valve means and between same and said source of pressurized fluid and controllably openable in response to downstream pressure drop of a predetermined magnitude thereacross and controllably closable in the absence thereof.

References Cited by the Examiner

UNITED STATES PATENTS

| | | | |
|---|---|---|---|
| 1,223,712 | 4/1917 | Meyers | 254—93 X |
| 1,286,051 | 11/1918 | Meyers | 254—93 |
| 2,100,564 | 11/1937 | Mandl et al. | 254—93 X |

WILLIAM FELDMAN, *Primary Examiner.*

OTHELL M. SIMPSON, *Examiner.*